UNITED STATES PATENT OFFICE.

ANTON GEORGE ANDERSON, OF HOBOKEN, NEW JERSEY, ASSIGNOR OF ONE-HALF OF SAID INVENTION TO E. W. RANNEY.

IMPROVED COMPOSITION FOR PAVEMENTS, SIDEWALKS, &c.

Specification forming part of Letters Patent No. 86,799, dated February 9, 1869.

*To whom it may concern:*

Be it known that I, ANTON GEORGE ANDERSON, of Hoboken, in the county of Hudson and State of New Jersey, have invented a new and Improved Composition for Flagging and Pavement; and I do hereby declare that the following is a full, clear, and exact description of the same.

The invention consists in a combination of *Carbo Japanis*, pine-pitch, tar, pulverized flint, and sand.

To enable others skilled in the art to make and use my invention, I will proceed to describe the same.

I put about one hundred pounds of *Carbo Japanis* into a suitable iron boiler or kettle, and add to it about six gallons of pine-pitch or tar, and then heat it till the whole is thoroughly melted. I then add gradually about fifty pounds of ground flint and stir thoroughly, and I then add gradually about four hundred pounds of dry warm sand, and when the whole is thoroughly mixed together it is ready for spreading. The ground or foundation should be made solid, smooth, level, and well drained. Then the material as above prepared is poured on and evenly spread while hot, and then covered over with warm fine sand, and, if necessary, it may be rolled with heavy hot rollers.

The pitch, tar, and flint may be increased or diminished or entirely left out when the circumstances seem to demand it.

As soon as the pavement is cold it is ready for use.

The materials when mixed ready for use may also be put into molds of a suitable form and made into blocks, and then laid for street-pavement and other purposes, and cemented together with tar and sand.

When over two inches in thickness are required it is advisable to lay the same in two or more layers, using the flint only on the top or finishing coat, which need not be more than one inch in thickness.

The *Carbo Japanis* is far superior to asphaltum, and costs less.

The pavement, when properly laid, is compact, impervious to water, and uninjured by the varieties of temperature. The pulverized flint makes it hard as stone.

This pavement is easily kept clean, does not become slippery by wear, and is not injured or affected by the climate. It can be laid out on surfaces of any extent without seam, and has very little odor. For yards, park and garden walks, promenades, sidewalks, and for floors in warehouses, cellars, depots, basements, &c., it should be two to three inches thick, and can be laid at a cost much less than stone, and is much preferable.

Having thus fully described my invention, what I claim as new, and desire to secure by Letters Patent, is—

The mixture and use of the above ingredients, for the purposes substantially as set forth.

ANTON GEORGE ANDERSON.

Witnesses:
J. D. REYMERT,
J. S. TALLMADGE.